(12) United States Patent
Ramkumar et al.

(10) Patent No.: US 9,191,513 B1
(45) Date of Patent: Nov. 17, 2015

(54) SYSTEM AND METHOD FOR DYNAMIC JOB ALLOCATION BASED ON ACOUSTIC SENTIMENTS

(71) Applicants: Nithya Ramkumar, Bangalore (IN); Soham Bhaumik, Bangalore (IN); Amit Krishna, Bangalore (IN); Mahesh Chowdary, Bangalore (IN); Hemant Kumar, Delhi (IN)

(72) Inventors: Nithya Ramkumar, Bangalore (IN); Soham Bhaumik, Bangalore (IN); Amit Krishna, Bangalore (IN); Mahesh Chowdary, Bangalore (IN); Hemant Kumar, Delhi (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/461,961

(22) Filed: Aug. 18, 2014

(30) Foreign Application Priority Data

Jun. 6, 2014 (IN) .......................... 2799/CHE/2014

(51) Int. Cl.
*H04M 3/00* (2006.01)
*H04M 5/00* (2006.01)
*H04M 3/523* (2006.01)

(52) U.S. Cl.
CPC .................................. *H04M 3/5233* (2013.01)

(58) Field of Classification Search
USPC ........................................ 379/265.07, 265.12
See application file for complete search history.

(56) References Cited

U.S. PATENT DOCUMENTS

| | | | |
|---|---|---|---|
| 7,627,475 B2 | 12/2009 | Petrushin | |
| 8,130,935 B1 * | 3/2012 | Coughlan et al. | 379/265.07 |
| 8,412,530 B2 | 4/2013 | Pereg et al. | |
| 2004/0062364 A1 * | 4/2004 | Dezonno et al. | 379/88.14 |
| 2010/0070276 A1 | 3/2010 | Wasserblat et al. | |
| 2013/0016816 A1 | 1/2013 | Odinak et al. | |
| 2013/0129076 A1 | 5/2013 | Kannan et al. | |
| 2014/0067375 A1 | 3/2014 | Wooters | |

* cited by examiner

*Primary Examiner* — Quynh Nguyen
(74) *Attorney, Agent, or Firm* — Finnegan, Henderson, Farabow, Garrett & Dunner, LLP (57) ABSTRACT

The present disclosure relates to methods of systems for allocating a call from a user to an agent. Embodiments of the disclosure may determine a set of sentiment indicators associated with the user from one or more acoustic parameters of the call. In addition, embodiments of the disclosure may select a candidate agent to handle the call based on the set of sentiment indicators and a sentiment handling capability associated with the candidate agent. Moreover, embodiments of the disclosure may allocate the call to the candidate agent.

24 Claims, 10 Drawing Sheets

SYSTEM AND METHOD FOR DYNAMIC JOB ALLOCATION BASED ON ACOUSTIC SENTIMENTS

TECHNICAL FIELD

This disclosure relates generally to customer service and support business. More specifically, it relates to a system and method for dynamically allocating a call from a customer to a customer service agent.

BACKGROUND

Typical customer call centers use traditional call-assignment processes such as round-robin based methods or skills-based routing methods to route a call from a customer to a call center agent when the customer dials in. In a round-robin based method, agents are generally assigned to only one queue of incoming calls of a certain type to answer the calls sequentially. This means that agents who can deal with a range of call types has to be reassigned to different queues at different times of the day to make the best use of their skills, or face being exposed to a wide variety of calls for which they are not trained. With skills-based routing, the skills needed for a particular call are often assessed by the dialed telephone number, as well as choices made in any associated interactive voice response (IVR) system. With this assessment, a skills-based routing system then attempts to match the call to a suitably trained agent. These traditional processes, however, lack an automatic analysis of historical and/or live conversations. For example, current call center routing systems cannot measure various emotions of a customer and an agent's ability to handle such emotions, and therefore cannot apply such knowledge in the process of routing the customer's call.

Therefore, it is desirable to develop a new call routing system and method capable of dynamically allocating a call from a customer to an agent based on an analysis of the emotions of the customer and based on the agent's ability to handle the emotions.

SUMMARY

Certain embodiments of the present disclosure relate to a method, implemented by a computer, for allocating a call from a user to an agent. The method may comprise determining a set of sentiment indicators associated with the user from one or more acoustic parameters of the call. In addition, the method may comprise selecting a candidate agent to handle the call based on the set of sentiment indicators and a sentiment handling capability associated with the candidate agent. Moreover, the method may comprise allocating the call to the candidate agent.

In certain embodiments, the method may comprise retrieving historical sentiment data associated with the user and selecting the candidate agent based on the historical sentiment data and the sentiment handling capability associated with the candidate agent.

In certain embodiments, determining the set of sentiment indicators may comprise measuring an acoustic parameter of a voice of the user and determining a score associated with each sentiment indicator based on the measured acoustic parameter.

In certain embodiments, the acoustic parameter includes at least one of a speaking intensity, a speaking rate, or presence of one or more pitches.

In certain embodiments, selecting the candidate agent may comprise determining a matching parameter indicating a difference between the set of sentiment indicators and sentiment handling capabilities of one or more available agents and selecting the candidate agent based on the matching parameter.

In certain embodiments, the sentiment handling capability of each available agent may include a set of emotion handling ratings corresponding to the set of sentiment indicators. The matching parameter may include a distance between a point representing the set of sentiment indicators and a point representing the set of emotion handling ratings associated with each available agent. The method may comprise calculating the distance for each available agent and selecting the available agent having the shortest distance to be the candidate agent.

In certain embodiments, the method may comprise analyzing a conversation between the user and the candidate agent and updating the sentiment handling capability associated with the candidate agent based on the conversation.

In certain embodiments, the method may comprise monitoring the set of sentiment indicators associated with the user during the conversation. In addition, the method may comprise determining whether the conversation proceeds into a positive or a negative direction based on the monitored set of sentiment indicators. Moreover, the method may comprise automatically alerting the candidate agent when it is determined that the conversation proceeds into a negative direction.

Certain embodiments of the present disclosure also relate to a computer system for allocating a call from a user to an agent. The computer system may comprise a processor operatively coupled to a memory device. The processor may be configured to execute instructions stored in the memory device to perform operations. The operations may comprise determining a set of sentiment indicators associated with the user from one or more acoustic parameters of the call. In addition, the operations may comprise selecting, by the computer, a candidate agent to handle the call based on the set of sentiment indicators and a sentiment handling capability associated with the candidate agent. Moreover, the operations may comprise allocating the call to the candidate agent.

Certain embodiments of the present disclosure also relate to a non-transitory, computer-readable medium storing instructions that, when executed by a processor device, cause the processor device to perform operations comprising determining a set of sentiment indicators associated with the user from one or more acoustic parameters of the call. In addition, the operations may comprise selecting a candidate agent to handle the call based on the set of sentiment indicators and a sentiment handling capability associated with the candidate agent. Moreover, the operations may comprise allocating the call to the candidate agent.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Systems and methods consistent with the present disclosure involve dynamic job allocation based on customer sentiment analysis. As used herein, a job may also be referred to as a call from a customer waiting in a queue to be answered or a call currently being answered by an agent. Dynamically allocating a job may also be referred to as automatically and/or adaptively allocating the job. Allocating a job to an agent may also be referred to as assigning or routing the job to the agent. Customer sentiments may also be referred to as customer emotions. As used herein, a customer may also be referred to as a user or a caller who initiates the call. Embodiments of the present disclosure may involve analysis of customer voice based on certain acoustic parameters. The analysis may generate estimations of one or more customer sentiments. Based on the estimations and agents' ability to handle the sentiments (also referred to as sentiment handling ability or emotion handling ability), the job may be allocated to an agent who is suitable to handle the sentiments.

Embodiments of the present disclosure may progressively monitor the conversation between the selected agent and the customer, and periodically update the sentiment estimations of the customer and/or the sentiment handling ability of the agent. Embodiments of the present disclosure may also monitor the direction of the conversation by monitoring the change of the customer sentiments during the conversation. If the customer sentiments change towards the negative direction, such as when the customer becomes angrier, embodiments of the present disclosure may automatically alert the agent and/or provide mitigating means such as forwarding the call to another suitable agent.

Figure 1:
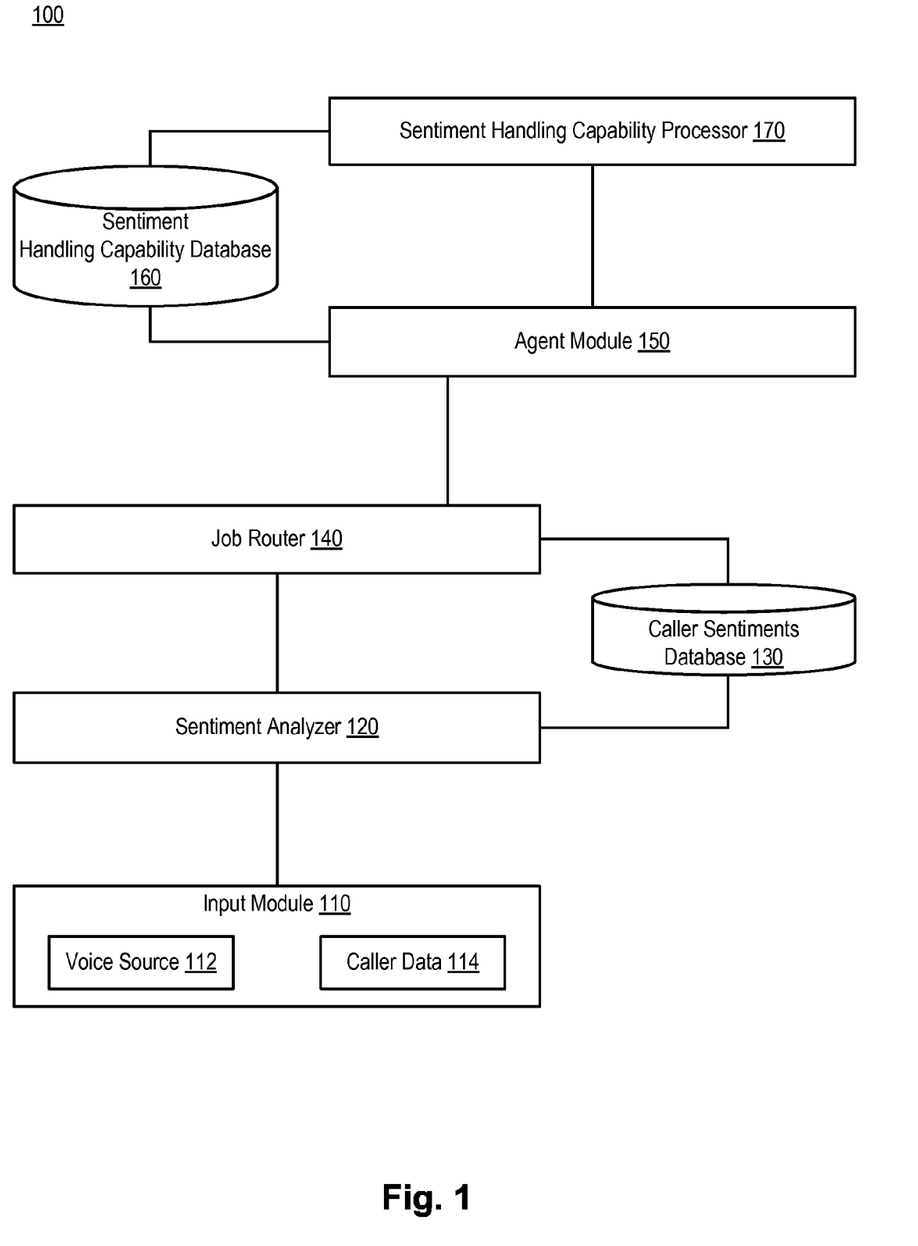
FIG. 1 illustrates an exemplary call allocation system, according to some embodiments of the present disclosure.

FIG. 1 illustrates an exemplary call allocation system 100. As shown in FIG. 1, system 100 may include an input module 110, a sentiment analyzer 120, a caller sentiments database 130, a job router 140, an agent module 150, a sentiment handling capability database 160, and a sentiment handling capability processor 170. One or more of these components may be implemented by a process device, as will be described in greater detail later with respect to FIG. 10.

Input module 110 may receive voice source 112 and caller data 114 from various input means. In some embodiments, input module 110 may include an interface to a caller queue to receive voice source 112. Input module 110 may also include an interface to a customer relation management database (not shown) to receive caller data 114. Voice source 112 may include voice data of a customer detected from an incoming call (e.g., when the customer calls a customer contact center). Caller data 114 may include caller specific data relating to call routing such as personal information of the caller and/or previously determined or recently updated call sentiments data.

Sentiment analyzer 120 may receive information from input module 110 and determine a set of sentiment indicators (e.g., emotions) associated with the caller based on the information. For example, sentiment analyzer 120 may extract voice samples from voice source 112 at a predetermined frequency and analyze one or more acoustic parameters based on the voice samples. The acoustic parameters may include speaking intensity, speaking rate (e.g., speed), presence of pitches, pitch range, speaking energy, mean fundamental frequency (also referred to as F0), etc. Based on one or more of these acoustic parameters, sentiment analyzer 120 may generate a set of sentiment indicators indicating the presence and/or the degree of various emotions in the incoming voice. Sentiment analyzer 120 may include a set of sentiment rules (e.g., in the form a configuration file), which contain the rules of determining the various emotions based on the acoustic parameters. Sentiment analyzer 120 may determine primary emotions such as joy, anger, sadness, disgust, surprise, fear, etc. In some embodiments, voice source 112 may contain multiple emotions. Accordingly, sentiment analyzer 120 may detect all the emotions present in the voice source 112.

Sentiment analyzer 120 may quantify the emotions using a predefined score from 0 to 1 (e.g., 0 being the least and 1 being the highest). In some embodiments, the score may indicate the probability or likelihood of a particular emotion. For example, a score of 0.2 associated with anger may refer to a situation in which the caller is less likely of being angry than, for example, another situation having a score of 0.8. Exemplary emotion scores are listed as follows:

voiceSourceA-{anger-0.0, fear-0.1, frustration-0.0, sadness-0.7, joy-0.0} voiceSourceB-{anger-0.6, fear-0.0, frustration-0.4, sadness-0.2, joy-0.0}

Once sentiment analyzer 120 determines sentiment data such as sentiment indicators and/or the scores, the determined sentiment data may be stored in caller sentiments database 130. Caller sentiments database 130 may store the consolidated scores of all the emotions identified by sentiment analyzer 120. Data associated with each caller may be accessed using a unique ID. In some embodiments, caller sentiments database 130 may store historical sentiment data associated with a caller. The historical sentiment data may be accessed by job router 140 to select a candidate agent before receiving sentiment indicators determined by sentiment analyzer 120.

As noted above, job router 140 may retrieve the sentiment data from called sentiment database 130 or directly from sentiment analyzer 120, and route the call to a suitable agent based on the sentiment data. For example, job router 140 may select a candidate agent from all available agents based on the sentiment data determined by sentiment analyzer 120. In another example, job router 140 may retrieve historical sentiment data associated with the caller (e.g., the caller may be identified using caller data 114 and historical sentiment data may be retrieved from caller sentiments database 130) and select the candidate agent based on the historical sentiment data.

In the process of selecting the candidate agent, job router 140 may also take into account the sentiment handling capability of the available agents. Similar to the score determined by sentiment analyzer 120 for each emotion, each agent may be assigned a rating associated with each emotion to indicate the agent's capability of handling a particular emotion. In some embodiments, the ratings may be measured on a scale of 0 to 1. To select candidate agent, job router 140 may employ a multi-dimensional graph (e.g., each axis may represent an emotion) and place the customer and available agents (e.g., as points) in the graph according to their coordinates. Job router 140 may then select the candidate agent based on the distance between the customer point and each available agent point.

Agent module 150 may route the call to a corresponding agent based on the details provided by job router 140. In some embodiments, call data about the agent may be provided to sentiment handling capability processor 170 for continuous evaluation of the agent's emotion handling capabilities.

As noted above, sentiment handling capability processor 170 may provide continuous evaluation of the agent's ability to handle different emotions. For example, sentiment handling capability processor 170 may progressively sample and analyze a conversation between the caller and the agent selected to handle the call at a predetermined frequency. The analysis may include all emotions identified by sentiment analyzer 120. Based on the analysis, sentiment handling capability processor 170 may continuously consolidate the ratings for all of the emotions and may store the consolidated sentiment handling capability ratings in sentiment handling capability database 160. Each agent may have multiple ratings, each associated with an emotion. Exemplary ratings are listed as follows:

agentX-{angerHandling-0.7, fearHandling-0.1, frustration Handling-0.0, sadnessHandling-0.0, joyHandling-0.9} agentY-{angerHandling-0.1, fearHandling-0.9, frustration Handling-0.4, sadnessHandling-0.2, joyHandling-0.85}

Figure 2:
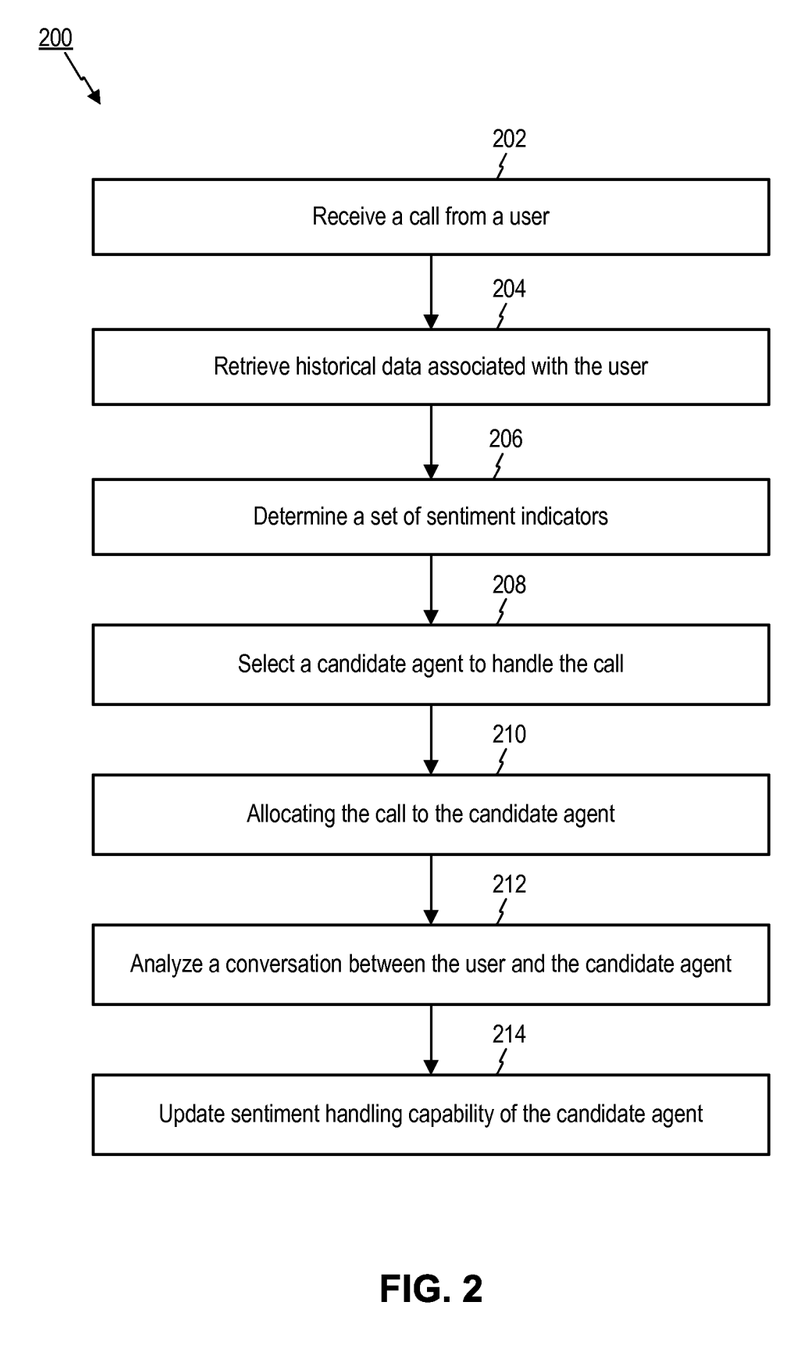
FIG. 2 is a flowchart of an exemplary method for call allocation, according to some embodiments of the present disclosure.

FIG. 2 is a flowchart of an exemplary method 200 for call allocation. At step 402, input module 110 may receive a call from a user (e.g., a customer calling the customer contact center) and receive voice source 112. At step 204, input module 110 may retrieve historical data associated with the user from a customer relation management database and/or from caller sentiments database 130. For example, input module 110 may retrieve personal information of the user from the customer relation management database. In another example, input module 110 may retrieve previously determined sentiment data associated with the user. The user may be identified by a user ID. Accordingly, input module 114 may locate the data associated with the user through a search of the user ID upon receiving the call. If the user is a new user, input module 110 may request to create a new record for the new user. The new user's phone number may be used as the user ID.

At step 206, sentiment analyzer 120 may determine a set of sentiment indicators associated with the user from one or more acoustic parameters of the call. As noted above, the set of sentiment indicators may include a pre-determined set of emotions, such as anger, joy, sadness, fear, etc. Acoustic parameters may include speaking intensity, speaking energy, speaking rate, presence of one or more pitches, pitch range, mean fundamental frequency (F0), etc.

Figure 3:
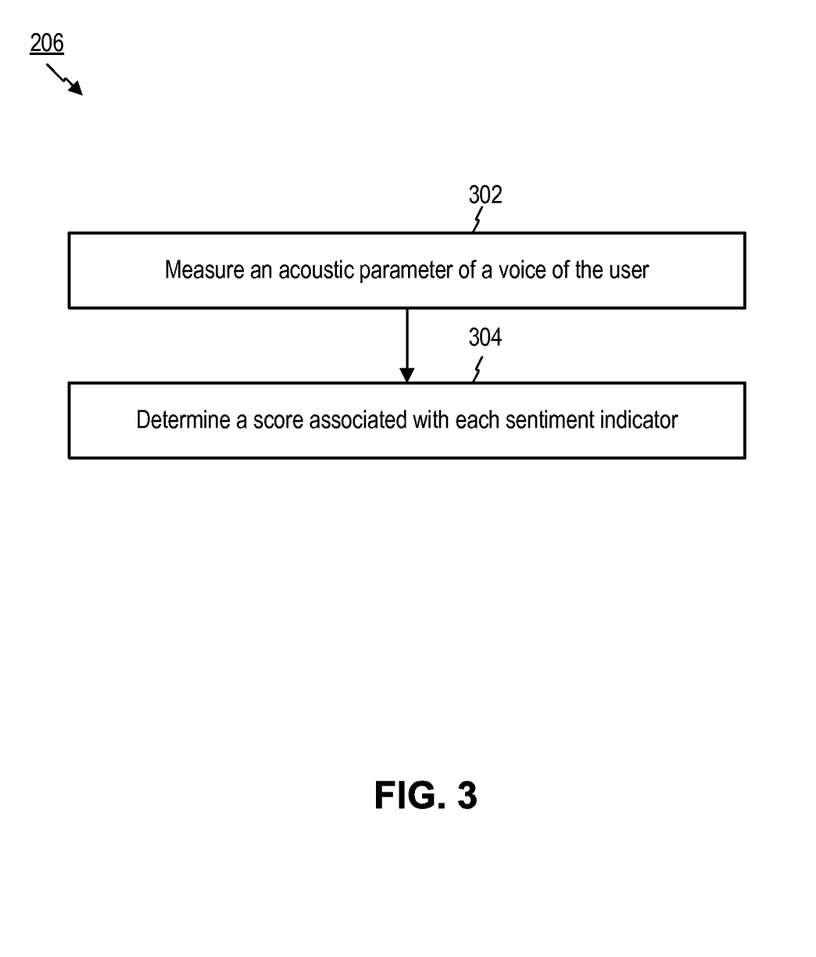
FIG. 3 is a flowchart of an exemplary method for determining sentiment indicators, according to some embodiments of the present disclosure.

FIG. 3 is a flowchart of an exemplary implementation of step 206 for determining sentiment indicators based on acoustic parameters. At step 302, sentiment analyzer 120 may measure one or more acoustic parameters from voice source 112. For example, sentiment analyzer 120 may sample voice source 112 and extract acoustic parameters from the sampled voice. In some embodiments, sentiment analyzer 120 may measure the intensity or energy of the voice and/or conduct Fourier transform on the voice to identify the frequency components of the voice. In some embodiments, sentiment analyzer 120 may measure the speaking rate (e.g., speed) by counting the number of words or sound units within a predetermined time interval. In some embodiments, sentiment analyzer 120 may detect the number of pitches present in the voice and determine the range of pitches.

Figure 4:
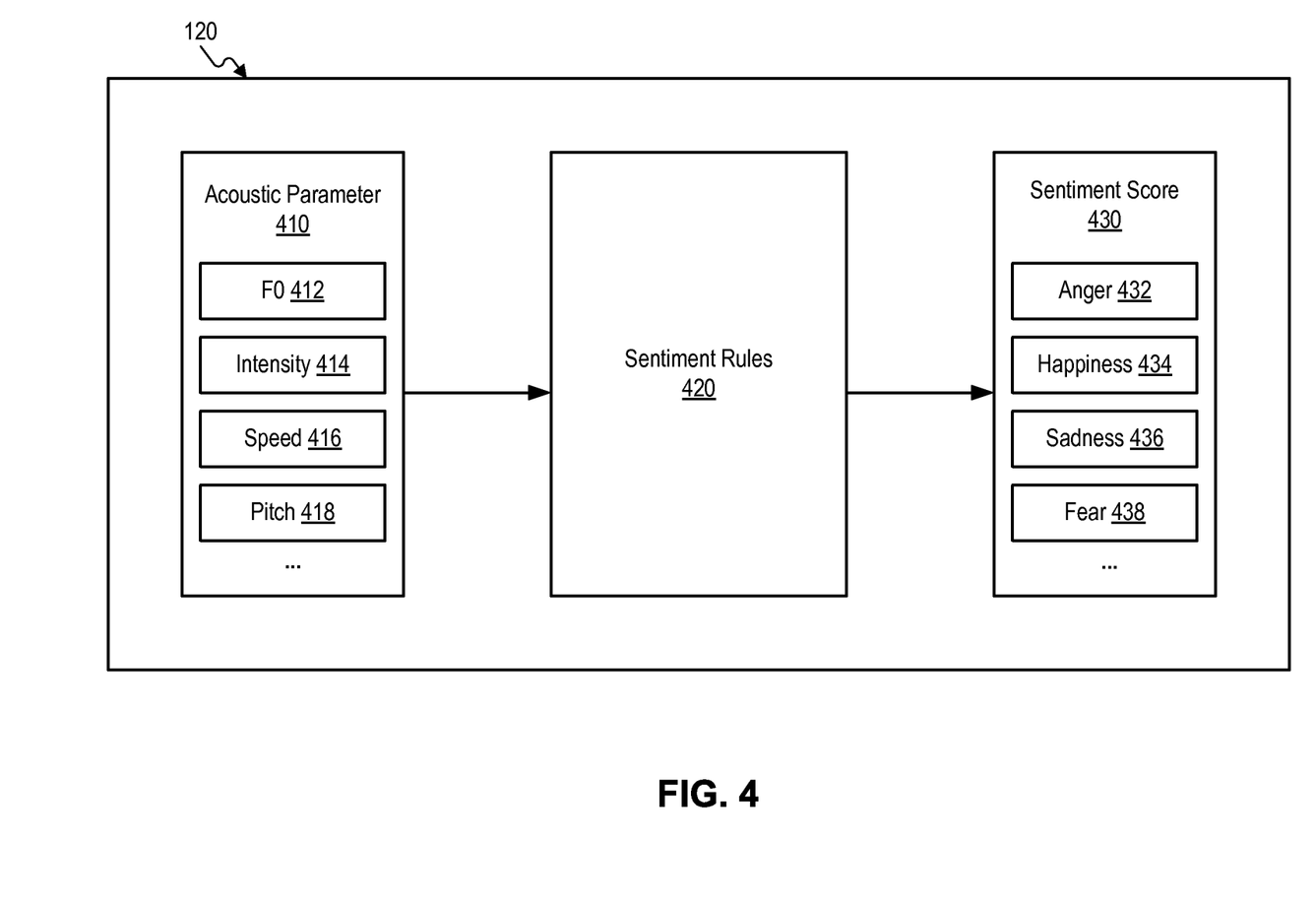
FIG. 4 is a block diagram of an exemplary sentiment analyzer, according to some embodiments of the present disclosure.

At step 304, sentiment analyzer 120 may determine a score associated with each sentiment indicator based on the measured acoustic parameters. FIG. 4 shows a block diagram of an exemplary sentiment analyzer 120 that performs step 304. In FIG. 4, sentiment analyzer 120 may include an acoustic parameter module 410 including a set of acoustic parameters, a sentiment score module 430 including a set of sentiment indicators and associated scores, and a set of sentiment rules 420 for determining the sentiment scores based on the acoustic parameters. Acoustic parameter 410 may include F0 412, intensity 414, speed 416, pitch 418, etc. Sentiment scores associated with each emotion may be on the scale from 0 to 1. For example, sentiment scores may include an anger score 432, a happiness score 434, a sadness score 436, a fear score 438, etc. In some embodiment, the score may indicate the likelihood of a particular emotion (e.g., the probability of a particular emotion is present). For example, an anger score of 0.3 may indicate that the probability that the caller is angry is about 30%. Sentiment rules 420 may include a set of predetermined rules that characterize the sentiment scores based on the acoustic parameters. For example, anger score 432 may be characterized by a high F0, a wide pitch range, a high energy, and a fast speed. Happiness score 434 may be characterized by an increase in pitch and pitch range, an increase in intensity, and a slow speed. Sadness may be characterized by a lower pitch, a narrow pitch range, and a slow speed. Fear may be characterized by an increase in F0 and an increase in F0 range. Based on sentiment rules 420, sentiment analyzer 120 may determine a sentiment score associated with each emotion.

Referring back to FIG. 2, at step 208, job router 140 may select a candidate agent to handle the call based on the set of sentiment indicators (e.g., sentiment scores) and a sentiment handling capability associated with the candidate agent. For example, job router 140 may receive sentiment information such as sentiment scores from sentiment analyzer 120. In some embodiments, job router 140 may receive sentiment information from caller sentiments database 130 (e.g., historical sentiment data). On the other hand, job router 140 may receive sentiment handling capability information associated with available agents from agent module 150. The sentiment handling capability may include a set of rating associated with each agent. Each rating may indicate the capability of the agent in handling a particular emotion that is defined by the set of sentiment indicators. For example, an agent may have a set of ratings corresponding to the set of sentiment indicators. If the set of sentiment indicators include Anger, Fear, Sadness, and Happiness, the set of ratings may also include Anger Handling Rating, Fear Handling Rating, Sadness Handling Rating, and Happiness Handling Rating. The rating may be a numerical number on the scale from 0 to 1, where a smaller number may indicate less experienced in handling a particular emotion and a greater number may indicate more experienced in handling the particular emotion.

Figure 5:
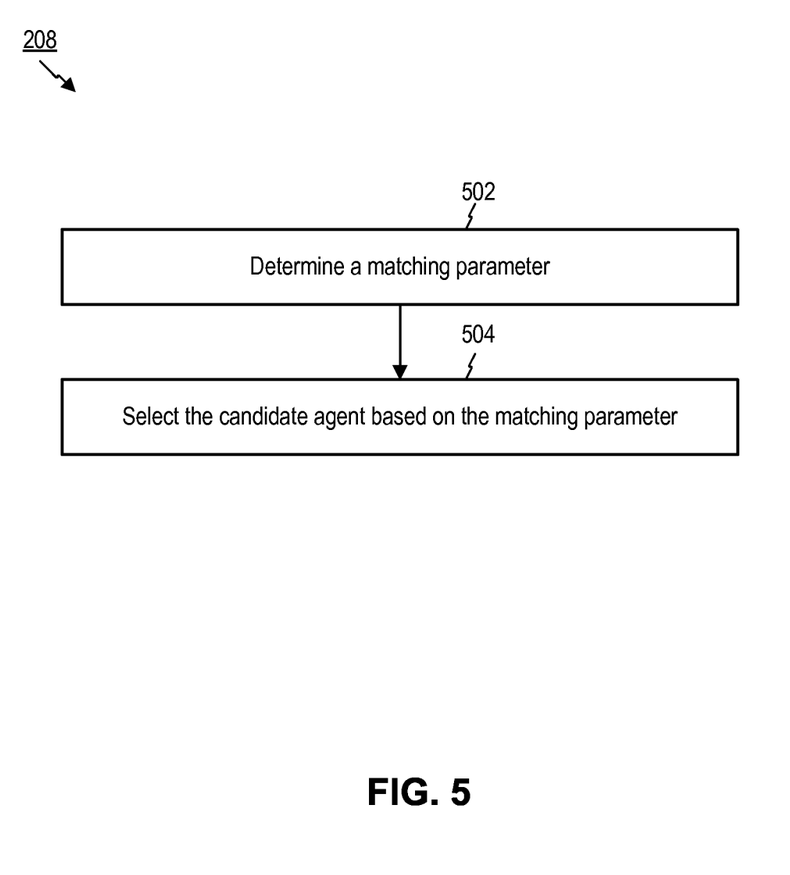
FIG. 5 is a flowchart of an exemplary method for selecting a candidate agent, according to some embodiments of the present disclosure.

FIG. 5 is a flowchart of an exemplary implementation of step 208 for selecting a candidate agent. In FIG. 5, step 208 may further include a step 502, at which job router 140 may determine a matching parameter indicating a difference between the set of sentiment indicators and the sentiment handling capabilities of one or more available agents. For example, suppose a set of sentiment indicators associated with a caller include Anger, Fear, Sadness, and Happiness, the associated sentiment scores are (0.2, 0.3, 0, 0), and the ratings for a first agent are (0.3, 0.5, 0.2, 0.7) and for a second agent are (0.1, 0.3, 0.1, 0.9), then the difference associated with the first agent can be calculated as (−0.1, −0.2, −0.2, −0.7) and the different associated with the second agent can be calculated as (0.1, 0, −0.1, −0.9). The matching parameter may include the set of individual differences in vector form, as described above, or may include a consolidated number in scalar form. For example, an exemplary consolidated matching parameter associated with the first agent may by the sum of all four elements of the difference vector (e.g., (−0.1)+(−0.2)+(−0.2)+(−0.7)=−1.2). Similarly, an exemplary consolidated matching parameter associated with the second agent may be −0.9 (e.g., 0.1+0+(−0.1)+(−0.9)=−0.9).

Figure 6:
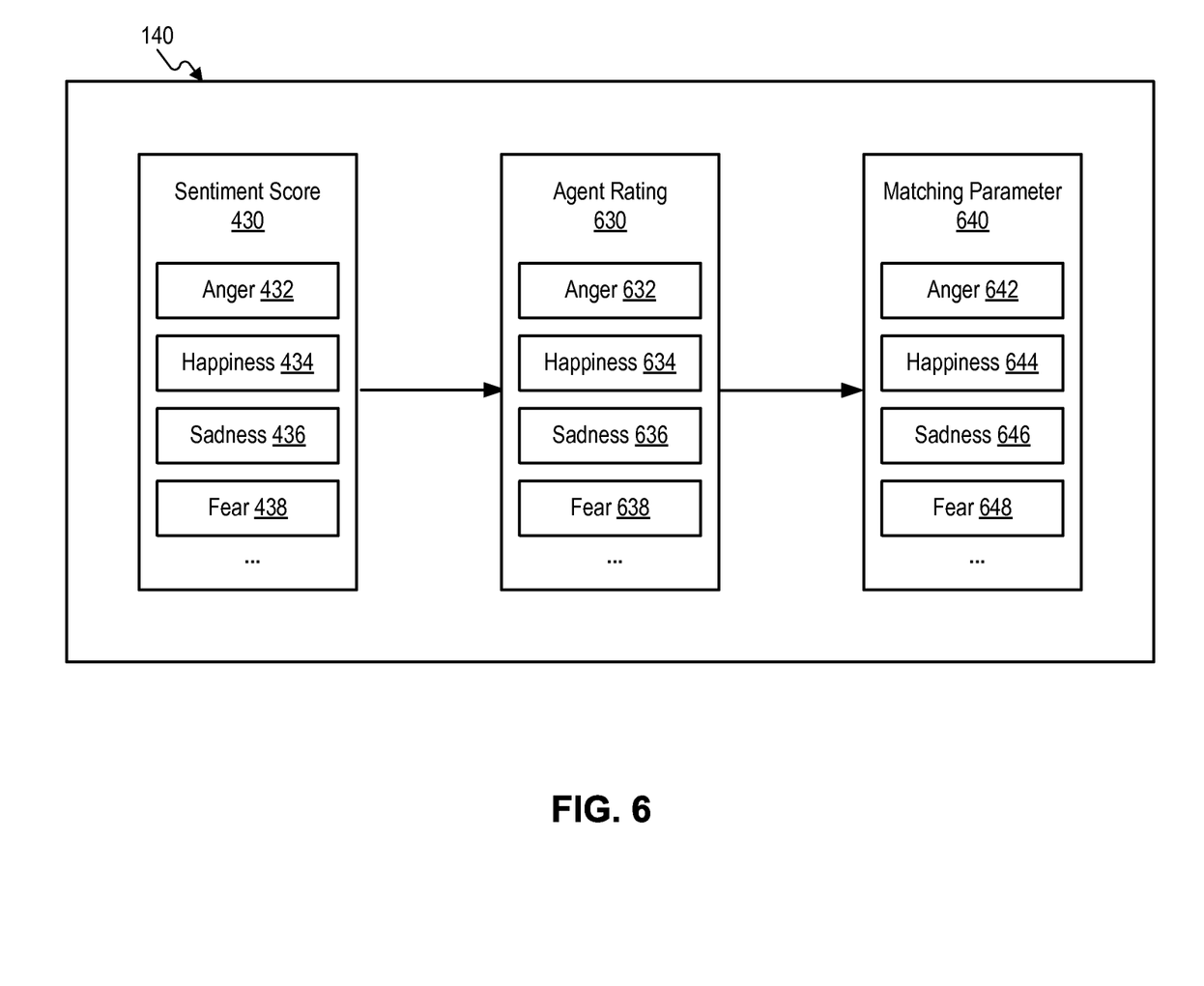
FIG. 6 is a block diagram of an exemplary job router, according to some embodiments of the present disclosure.

FIG. 6 is a block diagram of an exemplary job router 140 for implementing step 502. In FIG. 6, job router 140 may include a set of sentiment scores 430 and a set of agent ratings 630. Sentiment scores 430 may include anger score 432, happiness score 434, sadness score 436, fear score 438, etc. Agent ratings 630 may include a set of ratings corresponding to the set of emotions. For example, agent ratings 630 may include anger rating (e.g., capability to handle anger) 632, happiness rating 634, sadness rating 636, fear rating 638, etc. Based on sentiment scores 430 and agent rating 630, job router 140 may calculate a matching parameter 640. Matching parameter 640 may include a set of parameters each corresponding to an emotion. For example, matching parameter 640 may include an anger parameter 642, a happiness parameter 644, a sadness parameter 646, a fear parameter 648, etc. In some embodiments, each matching parameter may be determined by calculating the difference between a sentiment score and a corresponding (e.g., for the same emotion) agent rating. In some embodiments, matching parameter 640 may include a consolidated parameter. For example, the consolidated parameter may be determined by calculating a summation of all individual matching parameters.

Figure 7:
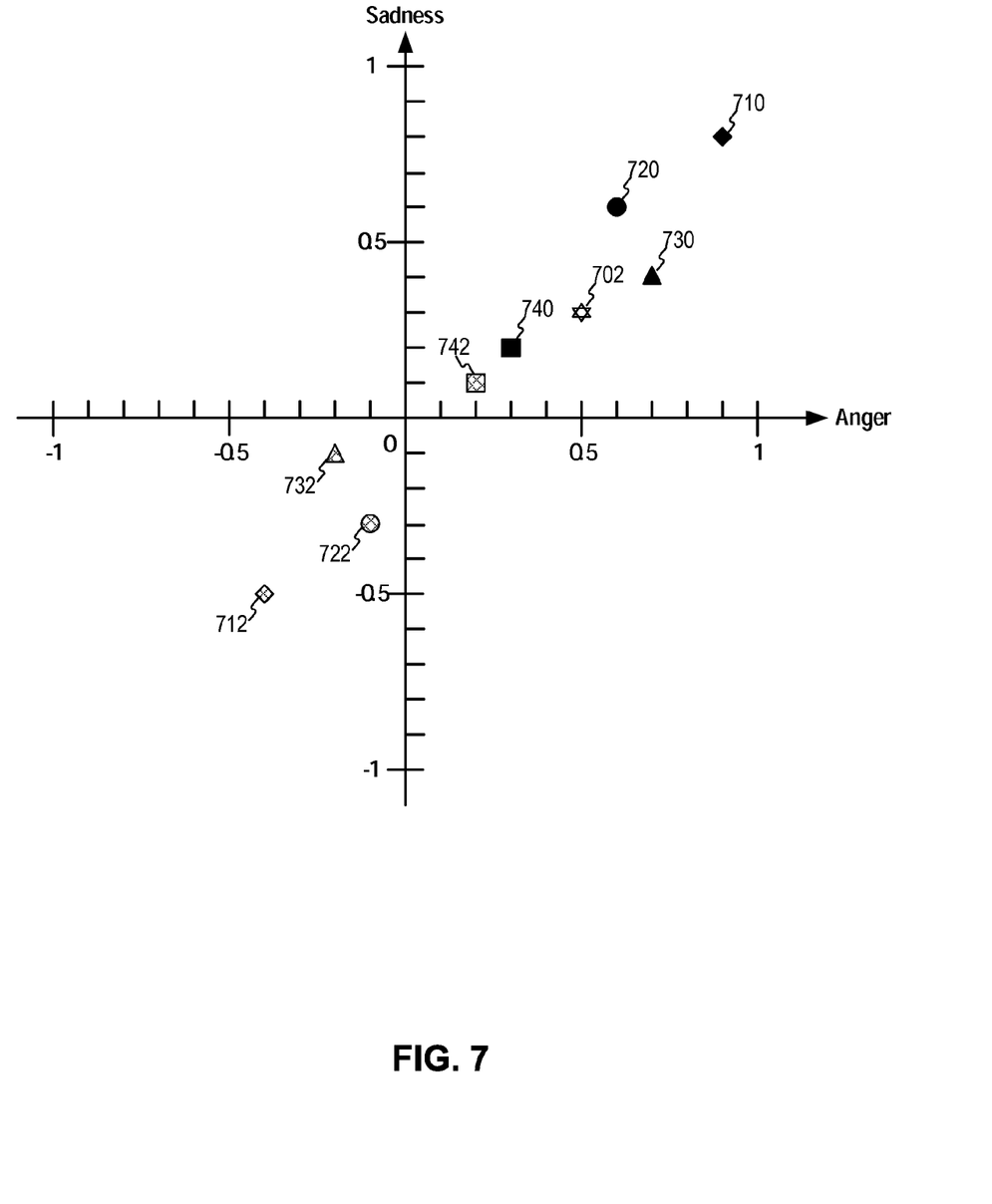
FIG. 7 illustrates an exemplary multi-dimensional graph for determining a candidate agent, according to some embodiments of the present disclosure.

Referring back to FIG. 5, at step 504, job router 140 may select the candidate agent based on the matching parameter. For example, job router 140 may represent sentiment score 430, agent rating 630, and matching parameter 640 in a multi-dimensional graph. FIG. 7 illustrates an exemplary two-dimensional graph including two emotions: anger and sadness. In FIG. 7, the horizontal axis represents the score/rating relating to anger, while the vertical axis represents the score/rating relating to sadness. As noted above, sentiment scores and agent ratings may be on the scale from 0 to 1. Accordingly, the sentiment scores and agent ratings may be represented as points in the first quadrant (e.g., where both anger and sadness have positive numbers). As shown in FIG. 7, point 702 may represent a sentiment score associated with a caller. The coordinates of point 702 may correspond to the individual scores. For example, in FIG. 7, point 702 has a coordinate (0.5, 0.3), which may correspond to an anger score of 0.5 and a sadness score of 0.3. Points 710, 720, 730, and 740 may represent four available agents having different ratings. Similar to point 702, the coordinates of the agent points may correspond to the individual ratings. For example, point 710 (0.9, 0.8) may represent an agent having an anger handling rating 0.9 and a sadness handling rating 0.8.

FIG. 7 also includes points representing matching parameters. For example, point 742 may represent a matching parameter for agent 740. As shown in FIG. 7, the coordinates of agent 740 are (0.3, 0.2), and the coordinates of caller 702 are (0.5, 0.3). Accordingly, point 742 may be calculated as the difference between points 702 and 740: (0.2, 0.1). Similarly, point 732 (−0.2, −0.1) may represent the matching parameter for agent 730 (e.g., coordinates (0.7, 0.4)); point 722 (−0.1, −0.3) may represent the matching parameter for agent 720 (e.g., coordinates (0.6, 0.6)); and point 712 (−0.4, −0.5) may represent the matching parameter for agent 710 (e.g., coordinates (0.9, 0.8)).

In some embodiments, job router 140 may calculate a distance for each available agent. For example, in FIG. 7, the distance between agent points (e.g., 710, 720, 730, and 740) and the caller point (e.g., 702) may be represented by the difference points (e.g., 712, 722, 732, and 742). A distance between an agent point and a caller point may be a signed distance. That is, the distance may be a positive distance or a negative distance. For example, point 742 may represent positive distances (e.g., (+0.2, +0.1)), while points 712, 722, and 732 may represent negative distances. In some embodiments, a negative distance may be considered shorter than a positive distance. For example, distances represented by point 712 may be considered shorter than those represented by point 742.

In some embodiments, job router 140 may select an agent having the shortest distance to be the candidate agent. For example, at shown in FIG. 7, point 712 (e.g., negative distance) may represent the shortest distance among the four agents 710, 720, 730, and 740. Accordingly, agent 740 may be selected as the candidate agent.

Once the candidate agent is determined, job router 140 may allocate the call to the candidate agent, as shown at step 210 in FIG. 2. In the example shown in FIG. 7, job router 140 may allocate the call to agent 710. Once the agent starts the conversation with the caller, sentiment handling capability processor 170 may analyze the conversation between the agent and the caller, as shown at step 212 in FIG. 2. For example, sentiment handling capability processor 170 may progressively sample the conversation. In some embodiments, sentiment handling capability processor 170 may periodically send the sampled voice data to sentiment analyzer 120 to measure various acoustic parameters and to determine sentiment indicators. Sentiment handling capability processor 170 may assess a direction in which the conversation proceeds based on the analysis result generated by sentiment analyzer 120. An exemplary method 800 for monitoring the conversation and assessing the direction in which the conversation proceeds is shown in FIG. 8.

Figure 8:
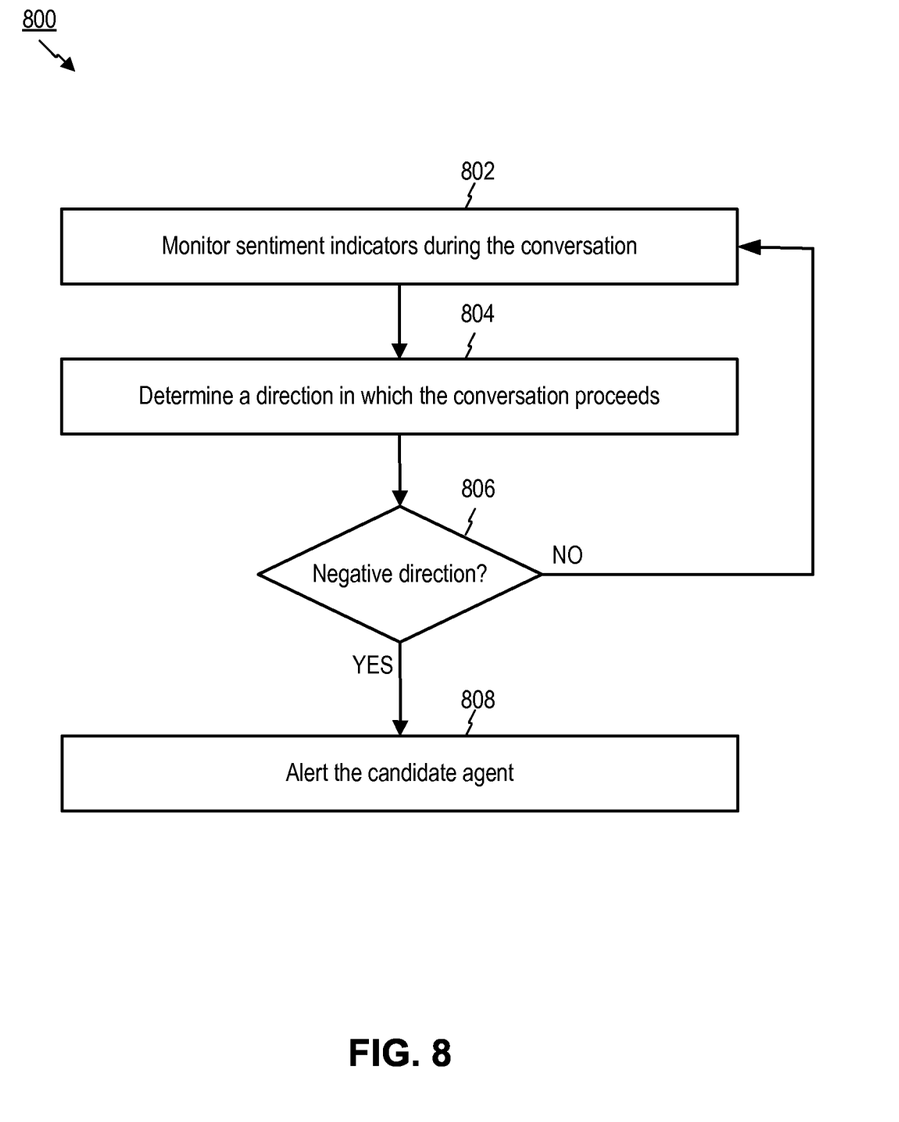
FIG. 8 is a flowchart of an exemplary method for monitoring a conversation, according to some embodiments of the present disclosure.
Figure 9:
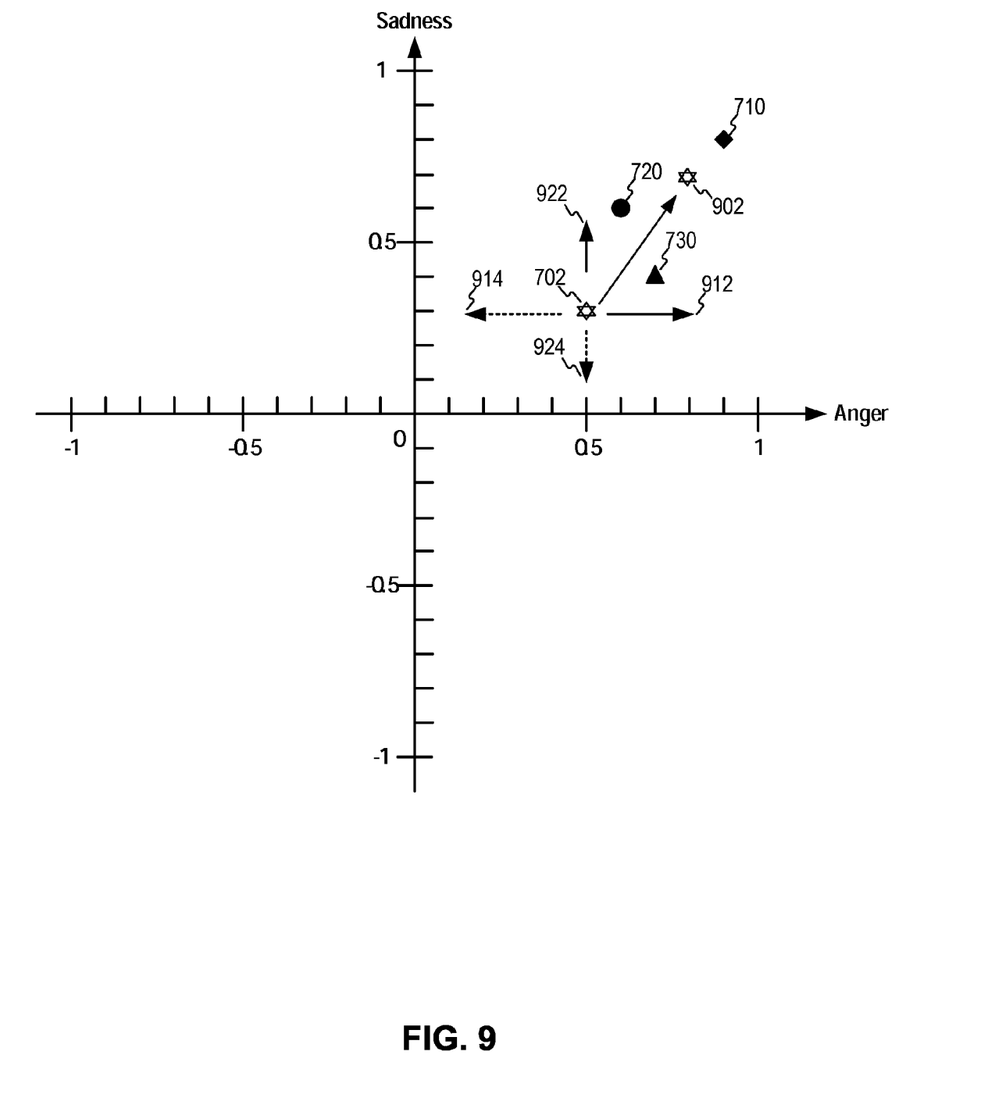
FIG. 9 illustrates an exemplary multi-dimensional graph for determining a direction in which a conversation proceeds, according to some embodiments of the present disclosure.

In FIG. 8, method 800 may include a step 802. At step 802, sentiment handling capability processor 170 may monitor the conversation and sample the voice data during the conversation. Sentiment handling capability processor 170 may then send the sampled voice data to sentiment analyzer 120. Sentiment analyzer 120 may extract acoustic parameters from the voice data and determine a set of sentiment indicators based on the acoustic parameters, as described above with respect to FIGS. 3 and 4. At step 804, sentiment handling capability processor 170 may analyze the sentiment indicators determined by sentiment analyzer 120 and determine a direction in which the conversation proceeds. In some embodiments, the direction may include a positive direction and a negative direction. FIG. 9 illustrates an exemplary graph for determining the direction. Referring to FIG. 9, a caller may initially locate at point 702 (e.g., before the call is routed to an agent). Once the call is routed to an agent, for example, agent 720, the conversation may start. During the conversation, the various emotions of the caller may change. For example, the caller may become angrier as the conversation proceeds. In this case, point 702 may move along direction 912. Similarly, if the caller becomes sadder as the conversation proceeds, point 702 may move along direction 922. Directions 912 and 922 may be referred to as negative directions because they indicate that the caller feels worse as the conversation proceeds. On the other hand, directions 914 (e.g., along which the anger score decreases) and 924 (e.g., along which the sadness score decreases) may be referred to as positive directions. It is noted that for emotions indicating a positive attitude of the caller, such as happiness, a positive direction may refer to a direction along which the happiness score increases and a negative direction may refer to a direction along which the happiness score decreases.

Suppose that in FIG. 9, agent 720 initially handles the call of caller 702. As the conversation proceeds, point 702 moves to point 902 (e.g., the caller becomes angrier and sadder). Sentiment analyzer 120 may capture this change (e.g., step 802) and sentiment handling capability processor 170 may determine that the direction in which the conversation proceeds is a negative direction (e.g., steps 804 and 806). Then at step 808, sentiment handling capability processor 170 may alert agent 720 that the conversation proceeds along a negative direction. In some embodiments, when the caller point moves beyond the capability of the agent currently handling the call (e.g., as shown in FIG. 9 in which point 902 moves beyond the capability of agent 720), job router 140 may select another agent, such as agent 710 who is more experienced to handle the call.

Referring back to FIG. 2, at step 214, sentiment handling capability processor 170 may update sentiment handling capability (e.g., agent ratings) of the agent selected to handle the call based on the conversation between the agent and the caller. For example, if the conversation proceeds to a positive direction, then the agent ratings may be upgraded. On the other hand, if the conversation proceeds to a negative direction, then the agent ratings may be downgraded. The updated agent ratings may be stored in sentiment handling capability database 160 and may be used in a future agent selection process.

Figure 10:
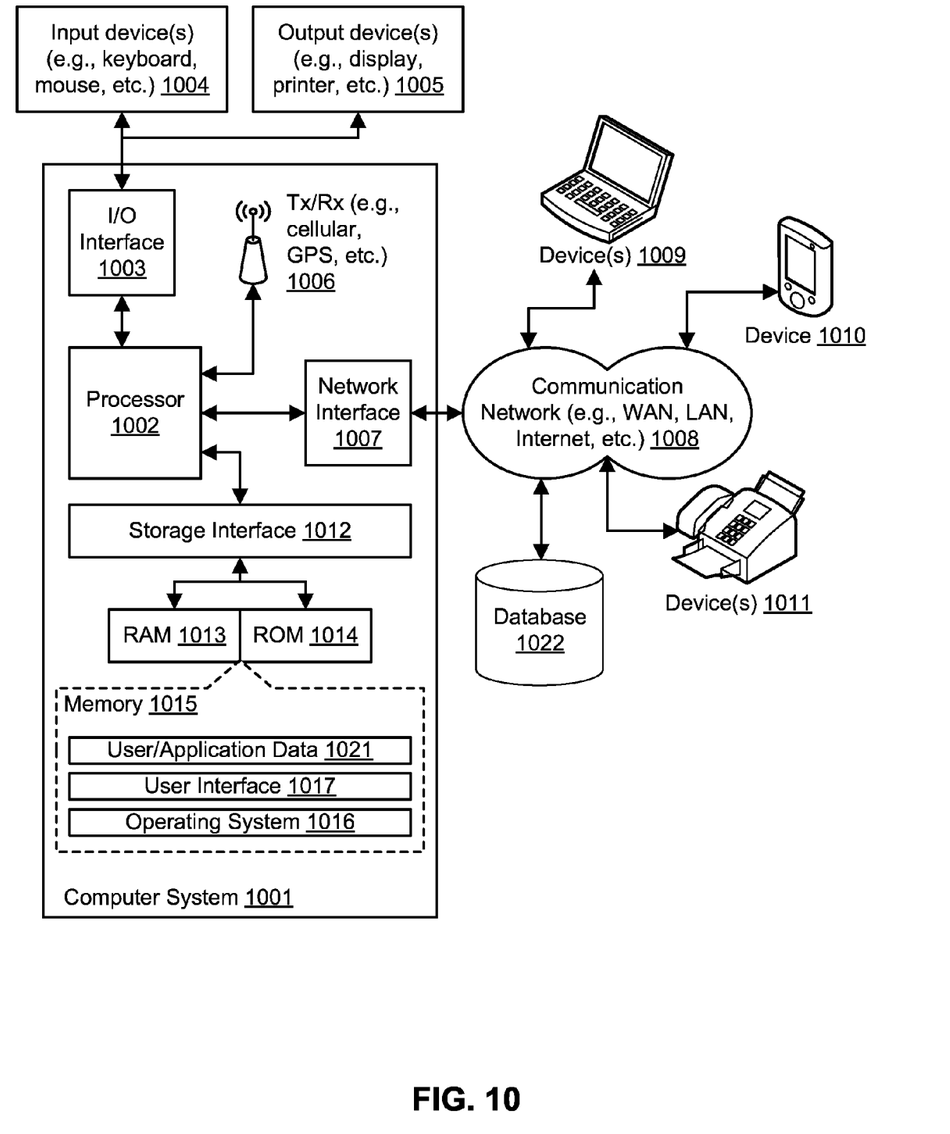
FIG. 10 illustrates an exemplary computer system for implementing methods and systems consistent with the present disclosure.

FIG. 10 illustrates an exemplary computer system 1001 for implementing methods and systems consistent with the present disclosure. For example, computer system 1001 may be used to perform the processes as described in FIG. 2. Further, computer system 1001 may be used to perform the function of the modules discussed above.

Computer system 1001 includes processor 1002, which may be a general purpose processor, such as various known commercial CPUs. Processor 1002 may interact with input device(s) 1004 and output device(s) 1005 via I/O interface 1003. A user or administrator may interact with computer system 1001 using input device(s) 1004 such as a keyboard, mouse, card reader, etc. Output device(s) 1005, such as a display or printer, may be used to display or print data reports produced from various process steps. Processor 1002 may also interact with storage interface 1012 to perform part or all of the disclosed method steps. Storage interface 1012 may access to memory 1015, which may include volatile or nonvolatile memory capable of storing instructions, as well as any data necessary to facilitate the disclosed method steps. For example, memory 1015 may encompass RAM 1013 or ROM 1014. Memory 1015 may store data such as an operating system 1016, user interface 1017, and user/application data 1021.

Processor 1002 may also interact with communication network 1008 via network interface 1007 to contact remote device(s) 1009, 1010, and/or 1011. Computer system 1001 may also communicate with database 1022 to gather remote or share data to perform any or all of the disclosed method steps. Computer system 1001 may further communicate wirelessly with cellular network, GPS satellites, etc. via transceiver 1006.

The specification has described systems and methods for dynamic job allocation. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method, implemented by a computer, for allocating a call from a user to an agent, the method comprising:
    determining, by the computer, a set of sentiment indicators associated with the user from one or more acoustic parameters of the call;
    selecting, by the computer, a candidate agent to handle the call based on the set of sentiment indicators and a sentiment handling capability associated with the candidate agent; and
    allocating the call to the candidate agent.

2. The method of claim 1, comprising:
    retrieving historical sentiment data associated with the user; and
    selecting the candidate agent based on the historical sentiment data and the sentiment handling capability associated with the candidate agent.

3. The method of claim 1, wherein determining the set of sentiment indicators comprises:
    measuring an acoustic parameter of a voice of the user;
    determining a score associated with each sentiment indicator based on the measured acoustic parameter.

4. The method of claim 1, wherein the acoustic parameter includes at least one of:
    a speaking intensity, a speaking rate, or presence of one or more pitches.

5. The method of claim 1, wherein selecting the candidate agent comprises:
    determining a matching parameter indicating a difference between the set of sentiment indicators and sentiment handling capabilities of one or more available agents; and
    selecting the candidate agent based on the matching parameter.

6. The method of claim 5,
    wherein:
        the sentiment handling capability of each available agent includes a set of emotion handling ratings corresponding to the set of sentiment indicators;
        the matching parameter includes a distance between a point representing the set of sentiment indicators and a point representing the set of emotion handling ratings associated with each available agent; and
    the method comprises:
        calculating the distance for each available agent; and
        selecting the available agent having the shortest distance to be the candidate agent.

7. The method of claim 1, comprising:
    analyzing a conversation between the user and the candidate agent; and
    updating the sentiment handling capability associated with the candidate agent based on the conversation.

8. The method of claim 7, comprising:
    monitoring the set of sentiment indicators associated with the user during the conversation;
    determining whether the conversation proceeds into a positive or a negative direction based on the monitored set of sentiment indicators; and
    automatically alerting the candidate agent when it is determined that the conversation proceeds into a negative direction.

9. A computer system for allocating a call from a user to an agent, the system comprising:
    a processor operatively coupled to a memory device, wherein the processor is configured to execute instructions stored in the memory device to perform operations comprising:
        determining a set of sentiment indicators associated with the user from one or more acoustic parameters of the call;
        selecting a candidate agent to handle the call based on the set of sentiment indicators and a sentiment handling capability associated with the candidate agent; and
        allocating the call to the candidate agent.

10. The system of claim 9, wherein the operations comprise:
    retrieving historical sentiment data associated with the user; and
    selecting the candidate agent based on the historical sentiment data and the sentiment handling capability associated with the candidate agent.

11. The system of claim 9, wherein determining the set of sentiment indicators comprises:
    measuring an acoustic parameter from a voice of the user;
    determining a score associated with each sentiment indicator based on the measured acoustic parameter.

12. The system of claim 9, wherein the acoustic parameter includes at least one of:
    a speaking intensity, a speaking rate, or presence of one or more pitches.

13. The system of claim 9, wherein selecting the candidate agent comprises:
    determining a matching parameter indicating a difference between the set of sentiment indicators and sentiment handling capabilities of one or more available agents; and
    selecting the candidate agent based on the matching parameter.

14. The system of claim 13,
    wherein:
        the sentiment handling capability of each available agent includes a set of emotion handling ratings corresponding to the set of sentiment indicators;
        the matching parameter includes a distance between a point representing the set of sentiment indicators and a point representing the set of emotion handling ratings associated with each available agent; and
    the operations comprise:
        calculating the distance for each available agent; and
        selecting the available agent having the shortest distance to be the candidate agent.

15. The system of claim 9, wherein the operations comprise:
    analyzing a conversation between the user and the candidate agent; and
    updating the sentiment handling capability associated with the candidate agent based on the conversation.

16. The system of claim 15, wherein the operations comprise:
    monitoring the set of sentiment indicators associated with the user during the conversation;
    determining whether the conversation proceeds into a positive or a negative direction based on the monitored set of sentiment indicators; and
    automatically alerting the candidate agent when it is determined that the conversation proceeds into a negative direction.

17. A non-transitory, computer-readable medium storing instructions that, when executed by a processor device, cause the processor device to perform operations comprising:
    determining a set of sentiment indicators associated with the user from one or more acoustic parameters of the call;

selecting a candidate agent to handle the call based on the set of sentiment indicators and a sentiment handling capability associated with the candidate agent; and allocating the call to the candidate agent.

18. The computer-readable medium of claim 17, wherein the operations comprise:

retrieving historical sentiment data associated with the user; and selecting the candidate agent based on the historical sentiment data and the sentiment handling capability associated with the candidate agent.

19. The computer-readable medium of claim 17, wherein determining the set of sentiment indicators comprises:

measuring an acoustic parameter from a voice of the user;

determining a score associated with each sentiment indicator based on the measured acoustic parameter.

20. The computer-readable medium of claim 17, wherein the acoustic parameter includes at least one of:

a speaking intensity, a speaking rate, or presence of one or more pitches.

21. The computer-readable medium of claim 17, wherein selecting the candidate agent comprises:

determining a matching parameter indicating a difference between the set of sentiment indicators and sentiment handling capabilities of one or more available agents; and selecting the candidate agent based on the matching parameter.

22. The computer-readable medium of claim 21, wherein:

the sentiment handling capability of each available agent includes a set of emotion handling ratings corresponding to the set of sentiment indicators;

the matching parameter includes a distance between a point representing the set of sentiment indicators and a point representing the set of emotion handling ratings associated with each available agent; and the method comprises:

calculating the distance for each available agent; and selecting the available agent having the shortest distance to be the candidate agent.

23. The computer-readable medium of claim 17, wherein the operations comprise:

analyzing a conversation between the user and the candidate agent; and updating the sentiment handling capability associated with the candidate agent based on the conversation.

24. The computer-readable medium of claim 23, wherein the operations comprise:

monitoring the set of sentiment indicators associated with the user during the conversation;

determining whether the conversation proceeds into a positive or a negative direction based on the monitored set of sentiment indicators; and automatically alerting the candidate agent when it is determined that the conversation proceeds into a negative direction.

* * * * *